US012800455B2

(12) United States Patent
Subhash et al.

(10) Patent No.: US 12,800,455 B2
(45) **Date of Patent: *Nov. 17, 2026**

(54) COMPACT STRESS WAVEGUIDE

(71) Applicants: University of Florida Research Foundation, Inc., Gainesville, FL (US); Mississippi State University, Starkville, MS (US)

(72) Inventors: Ghatu Subhash, Gainesville, FL (US); Richard Y. Leonard, III, Madison, AL (US); Wilburn Whittington, Starkville, MS (US)

(73) Assignees: University of Florida Research Foundation, Inc., Gainesville, FL (US); Mississippi State University, Starkville, MS (US)

( * ) Notice: Subject to any disclaimer, the term of this patent is extended or adjusted under 35 U.S.C. 154(b) by 1326 days.

This patent is subject to a terminal disclaimer.

(21) Appl. No.: 17/590,878

(22) Filed: Feb. 2, 2022

(65) Prior Publication Data

US 2022/0244149 A1 Aug. 4, 2022

Related U.S. Application Data

(60) Provisional application No. 63/145,646, filed on Feb. 4, 2021.

(51) Int. Cl.
*G01N 3/06* (2006.01)
*G01N 3/30* (2006.01)

(52) U.S. Cl.
CPC ............... *G01N 3/062* (2013.01); *G01N 3/30* (2013.01); *G01N 2203/001* (2013.01); *G01N 2203/0658* (2013.01)

(58) Field of Classification Search
CPC .... G01N 3/062; G01N 3/30; G01N 2203/001; G01N 2203/0658; G01N 2203/0075
USPC ........................................................... 73/781
See application file for complete search history.

(56) References Cited

U.S. PATENT DOCUMENTS

2004/0080455 A1* 4/2004 Lee ...................... H01Q 21/065 343/700 MS
2015/0308932 A1* 10/2015 Whittington ........... G01N 3/062 73/760
2020/0076395 A1* 3/2020 Kamo ..................... G01S 7/032
(Continued)

FOREIGN PATENT DOCUMENTS

JP 2000162057 A * 6/2000
JP 2000162057 A2 6/2000
(Continued)

OTHER PUBLICATIONS

ISR Mailed; Apr. 7, 2022; International Application No. PCT/US22/70466 p. 1-20.

*Primary Examiner* — Marrit Eyassu
(74) *Attorney, Agent, or Firm* — Thomas Horstemeyer LLP.

(57) ABSTRACT

The present disclosure relates to compact waveguides. One example includes a primary bar, and an impedance-matched series of secondary bars that is impedance-matched with the primary bar at a connection point that joins at least one secondary bar of the impedance-matched series of secondary bars to the primary bar. The secondary bars are noncollinear and nonconcentric with the primary bar.

9 Claims, 11 Drawing Sheets

(56) References Cited

U.S. PATENT DOCUMENTS

2023/0102304 A1 * 3/2023 Latrasse ................ G02F 1/2257
385/2

FOREIGN PATENT DOCUMENTS

JP 4057761 B2 * 3/2008
WO 2019234416 A1 12/2019

* cited by examiner

COMPACT STRESS WAVEGUIDE

CROSS-REFERENCE TO RELATED APPLICATIONS

This application claims priority to, and the benefit of, co-pending U.S. provisional application entitled "COMPACT STRESS WAVEGUIDE" having Ser. No. 63/145,646, filed Feb. 4, 2021, which is hereby incorporated by reference in its entirety.

BACKGROUND

In mechanical testing, determination of the stress-strain response of a material is a fundamental requirement to assess the suitability of a material for an engineering application. However, this stress-strain response for most materials is strain-rate dependent where the strain rate is defined as the strain accumulated in the test divided by the time duration over which the strain is accumulated. Quasistatic or low strain rate deformation (e.g., up to $10^{-2}$/s) tests are used for many engineering applications. There are also numerous applications (such as crash worthiness of vehicles, impact, ballistics, high speed machining) where a high strain rate response (e.g., above $10^3$/s) of a material is needed so that the suitability of a material can be assessed.

Servo hydraulic machines can be supplied for quasistatic testing. To test materials in the high-intermediate range (e.g., $10^2$/s-$10^3$/s) to high range (e.g., $10^3$/s-$10^4$/s), a split Hopkinson pressure bar (SHPB) apparatus is often used. However, these machines cannot test materials in the low-to-intermediate strain-rate range of $10^{-1}$/s-$10^2$/s. For example, a SHPB test method uses 1-dimensional (1-D) stress wave propagation principles to determine the stress-strain response of a material. To achieve this 1-D condition in the test procedure, the equipment is designed to have long rods whose lengths (L) are larger than their diameters (D). The SHPB has two axially aligned long rods and a projectile launcher. A specimen is held between the two rods and the projectile launcher propels a short rod toward the long rods. The impact generates a 1-D stress wave in the rods. In most of the laboratories, bars typically have lengths between two and three meters (2 m-3 m) and diameters between six and twenty-five millimeters (6 mm-25 mm). This makes the total length of the equipment to be about ten meters (10 m). Longer length SHPB apparatuses are used to achieve strain rates below $10^2$/s. A longer rod can accommodate a longer duration stress wave and hence a lower strain rate can be achieved during the test. However, this adds to the capital requirement into several tens of thousands of dollars and requires several tens of meters of length in floor space.

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1A:
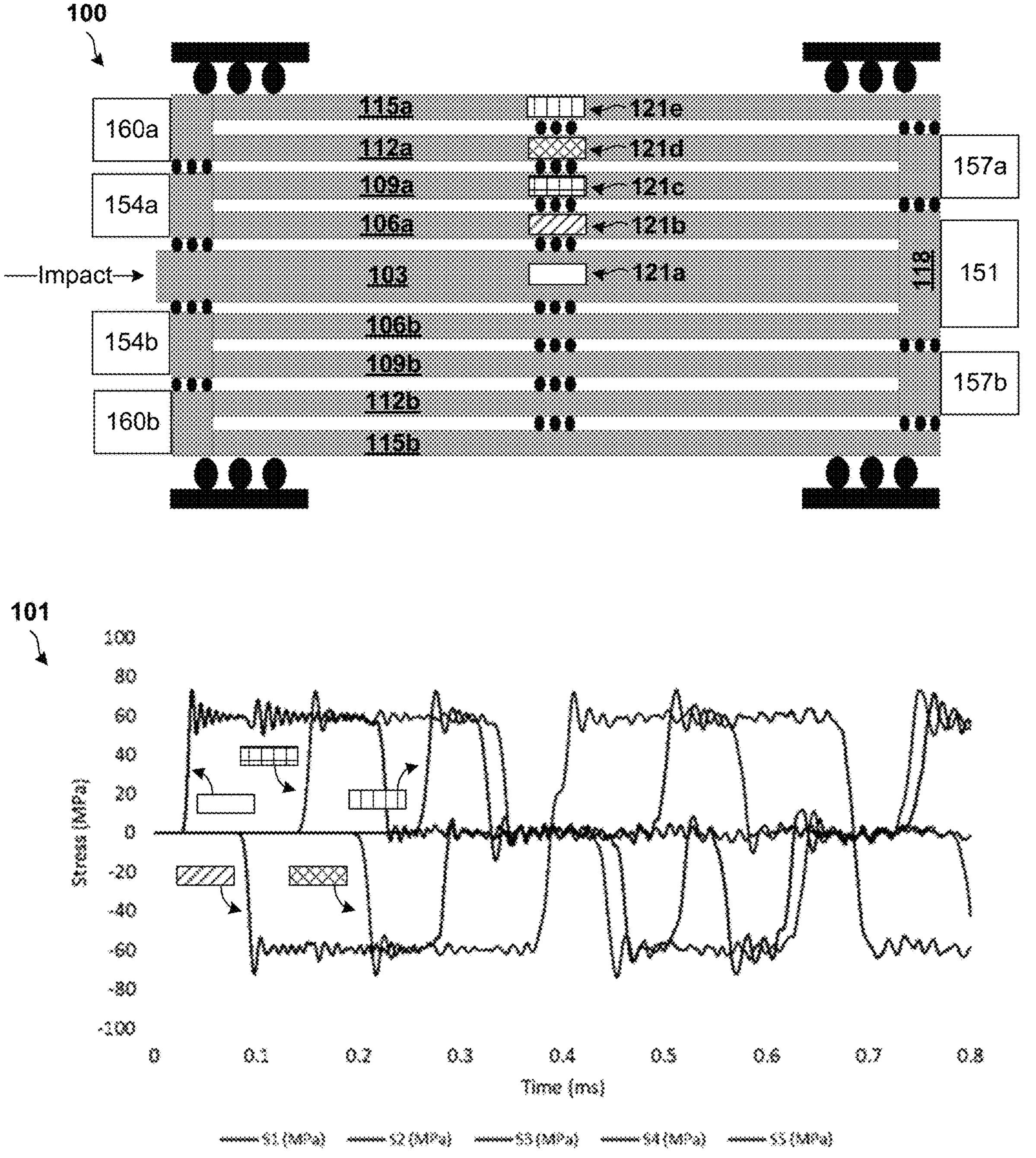
FIG. 1A illustrates an example compact stress waveguide and a graph of stress measurements according to the present disclosure.

The present disclosure relates to a compact stress waveguide. Quasistatic or low strain rate deformation (e.g., up to $10^{-2}$/s) tests are used for many engineering applications. There are also numerous applications (such as crash worthiness of vehicles, impact, ballistics, high speed machining) where a high strain rate response (e.g., above $10^3$/s) of a material is needed so that the suitability of a material can be assessed. To test materials in the high-intermediate range (e.g., $10^2$/s-$10^3$/s) to high range (e.g., $10^3$/s-$10^4$/s), a split Hopkinson pressure bar (SHPB) apparatus can be used. However, these machines cannot test materials in the low-to-intermediate strain-rate range of $10^{-1}$/s-$10^2$/s.

For example, a SHPB test method uses 1-dimensional (1-D) stress wave propagation principles to determine the stress-strain response of a material. To achieve this 1-D condition in the test procedure, the equipment is designed to have long rods whose lengths (L) are much larger than their diameters (D). The SHPB has two long rods and a projectile launcher. A specimen is held between the two axially aligned rods and the projectile launcher propels a short rod toward the long rods. The impact generates a 1-D stress wave in the rods. In most of the laboratories, bars can have lengths between two and three meters (2 m-3 m) and diameters between six and twenty-five millimeters (6 mm-25 mm). This makes the total length of the equipment to be about ten meters (10 m). Longer length SHPB apparatuses are used to achieve strain rates below $10^2$/s. A longer rod can accommodate a longer duration stress wave and hence a lower strain rate can be achieved during the test. However, this adds to the capital requirement into several tens of meters of length in floor space, which can be space and cost prohibitive.

The present disclosure describes mechanisms that provide for a compact waveguide technology that can accommodate longer duration stress waves and lower strain rates in a much smaller form factor than existing technologies. This compact waveguide can meet the demand for testing materials in the strain rate range of $10^{-1}$/s to $10^2$/s (and widened ranges including higher and lower strain rates) without the need for huge capital or space requirements. The present disclosure also enables a single compact stress waveguide to be configured to provide a wide range of different strain rates that would traditionally require multiple different bars of differing lengths to achieve.

A folded-bar design of a compact stress waveguide (instead of one long bar in a single line) can be used to accommodate any length incident stress wave in a compact waveguide form. A compact waveguide can include a waveguide that has an acoustic length that is at least an integer multiple (e.g., >2) of its physical length, such as an acoustic length that is more than twice its physical length, and far greater. Examples described explicitly include a waveguide with an acoustic length 79 times its physical length, and much greater multiples can be achieved through the mechanisms and principles described.

The folded-bar design can be referred to as a "Millipede Hopkinson Bar", or "multidimensional Hopkinson Bar" because one can have any number of folds in multiple dimensions to accommodate a long stress wave thus achieving the desired strain rate in the low intermediate strain rate range of $10^{-1}$/s to $10^{2}$/s, and any desired range. Depending on the area of cross section and length of each bar this design can be accommodated in a small area. In some cases, for each length of bar (of the folded bar), its length can be greater than its width. For example, a length to width (L/W) or length to diameter ratio (L/D) can be greater than one, greater than or equal to two, greater than or equal to five, greater than or equal to ten, and greater than or equal to twenty which can be chosen depending on design parameters to obtain one dimensional stress wave propagation characteristics. The folded bar design can use the lengths of bar in multiple dimensions. The lengths of bar can be parallel lengths of bar connected using branches and/or corners.

FIG. 1A shows a compact stress waveguide 100 as well as a graph 101 of stress measurements over time. The compact stress waveguide 100 can include a primary or center bar 103 that branches symmetrically into two branches. Each branch can include a series of bars that is symmetrical with the other branch, and can have a serpentine shape connected using junctions, connection joints, or connection points at alternating ends. This can be a two-dimensional branching compact stress waveguide that includes bars or lengths that are symmetrical about one plane of symmetry. Each bar in the series can be noncollinear and nonconcentric with the center bar 103. Each bar can be parallel to the center bar 103.

A first branch can include the lengths of bar or bars 106*a*, 109*a*, 112*a*, and 115*a*. The bars 106*a*, 109*a*, 112*a*, and 115*a* can be parallel to the center bar 103. A second branch can include bars 106*b*, 109*b*, 112*b*, and 115*b*. The bars 106*b*, 109*b*, 112*b*, and 115*b* can be parallel to the center bar 103 and symmetrical with the bars 106*a*, 109*a*, 112*a*, and 115*a*. In some examples, each of the bars 106*a*, 109*a*, 112*a*, and 115*a*, and the bars 106*b*, 109*b*, 112*b*, and 115*b* can have a length to width ratio chosen to obtain one dimensional stress wave propagation characteristics.

A sum of the impedances of the mirrored branches from the center bar 103 can be equivalent to an impedance of the center bar 103. This branch impedance matching can be achieved in a number of manners. For example, where a single material is used for the center bar 103 and all branches, the sum of the cross-sectional areas of the branches can match a cross-sectional area of the center bar 103. However, different materials can be used, with different cross-sectional areas and the different materials are selected to ensure that a sum of the branch impedances is equivalent to the impedance of the center bar 103. As can be seen, the center bar 103 branches into the bars 106*a* and 106*b*. When the primary or center bar 103 impacts, or is impacted, at a proximal end to an impact point, a wave propagating in the center bar 103 branches into bars 106*a* and 106*b* that branch at its distal end from the impact point.

The distal end of the center bar 103 can branch into the bars 106*a* and 106*b* using a branching connection point or branching point 118. The branching point 118, can be attached to the center bar 103 and the bars 106*a* and 106*b* by welding, mechanical fit, bonding materials such as glue or epoxy, screwed connection, threaded connection, press fit, forging, frictional welding, and/or any other mechanical connection. In some cases, the center bar 103, the bars 106*a* and 106*b*, and the branching point 118 can be part of a singular object rather than multiple components, such as a 3D printed object, a molded object, or another singular object along with the other bars of the compact stress waveguide 100. The bar 106*a* can be attached to the bar 109*a* by a connection point that is attached by welding, mechanical fit, bonding materials such as glue or epoxy, screwed connection, threaded connection, press fit, forging, frictional welding, and/or any other mechanical connection. Since no branching occurs at this connection point, the bar 106*a* can have a same impedance as the bar 109*a*, as well as a same cross-sectional area in which the materials are the same. The other connection points in the upper and lower branches can also be described in this manner, as can be understood.

Since the compact stress waveguide 100 can be manufactured out of flat (e.g., square rectangular cross section) bars, the boundary conditions at the connection points can be optimized to increase performance. However, the compact stress waveguide 100 can be manufactured out of bars having any cross-sectional shape, such as circular, triangular, rectangular, pentagonal, hexagonal, and so on. Ideal boundary conditions can include fixing the bottoms (and/or tops) of all passes in the vertical direction. Quarter symmetry can be assumed. Some systems and implementations can include the shown lubricated or unlubricated roller bearings to ensure a stiff boundary that minimizes or reduces frictional losses as the wave passes through each connection point and each pass. Roller bearings can be included on each pass or bar, as well as along square or rounded connection points, in order to minimize frictional losses as well as to ensure uniaxial motion (along the length) of the particles during the wave propagation. Some implementations can include lubricated shims (e.g., using lubricating powder) to reduce frictional losses, in addition to or rather than roller bearings.

A tool or system that uses the compact stress waveguide 100 can include a sensor 121*a* on the center bar 103. This sensor 121*a* can be used to detect and monitor a waveform of a wave propagating in the compact stress waveguide 100. In some cases, only a single sensor 121*a* is used for waveform detection. In other cases, the sensors 121*b*, 121*c*, 121*d*, and 121*e* can be included. The graph 101 shows, based on explicit finite element analysis, the propagation of a square wave through each of the passes of the compact stress waveguide 100. The graph shows stress waveforms based on the sensors 121*a*, 121*b*, 121*c*, 121*d*, and 121*e* in the compact stress waveguide 100 over time. The stress waveforms are coded according to the respective patterns indicated on the sensors 121*a*, 121*b*, 121*c*, 121*d*, and 121*e*. The sensors 121*a*-121*e* can include any device and method of detecting the propagation of a waveform such as a square wave through the compact stress waveguide 100. This can include optical, piezoelectric, laser, vibration, accelerometer, contact, non-contact, electrical, opto-electrical, and other types of sensor devices.

The compact stress waveguide 100 can also include a number of momentum traps 151, 154*a*, 154*b*, 157*a*, 157*b*, 160*a*, and 160*b*. The momentum traps can be used to tune the compact stress waveguide 100 to a desired propagation length. For example, the physical length of each of the center bar 103, and the branch bars 106*a*, 109*a*, 112*a*, and 115*a*, 106*b*, 109*b*, 112*b*, and 115*b* can be "L," for the purpose of illustration. In this case, if the momentum trap 151 is activated then a total effective acoustic length of the compact stress waveguide 100 for propagation can be L.

If instead the momentum traps 154*a* and 154*b* are activated, then the total effective length of the compact stress waveguide 100 can be 2L, since the waveform can propagate from the impact point, through the center bar 103, and then concurrently through both bars 106*a* and 106*b*. Since the waveform can be split through branches corresponding to bars 106*a* and 106*b*, which together match the impedance of the center bar 103, the time for the waveform to propagate and reflect within the compact stress waveguide 100 can be effectively the same as a single bar of length 2L.

In an example where the momentum traps 157*a* and 157*b* are activated, then the total effective length of the compact stress waveguide 100 can be 3L, since the waveform can propagate from the impact point, through the center bar 103, and then concurrently through branches corresponding to bars 106*a*-109*a* and 106*b*-109*b*. In an example where the momentum traps 160*a* and 160*b* are activated, then the total effective length of the compact stress waveguide 100 can be 4L, since the waveform can propagate from the impact point, through the center bar 103, and then concurrently through branches corresponding to bars 106*a*-112*a* and 106*b*-112*b*. If all momentum traps are deactivated, the total effective length of the compact stress waveguide 100 can be 5L. The two parallel bars 106*a* and 106*b* can be considered a single "pass" that provides 1L additional effective acoustic length, since a wave propagating through the compact stress waveguide 100 can pass through the two parallel bars 106*a* and 106*b* concurrently, and the sum of their impedances is equivalent to that of the center bar 103. If each of the parallel bars 115*a* and 115*b* were to branch vertically or into and out of the figure in the orientation shown, then the sum of the sub-branches' impedances can be equivalent to the impedance of each of the bars 115*a* and 115*b*. Each of the branch bars 115*a* and 115*b* has one-half of the impedance of the center bar 103. As a result, four parallel bars of sub-branches can be equivalent to a single pass that provides 1L additional effective acoustic length, since each of the four sub-branches from the branch bars 115*a* and 115*b* has one fourth of the impedance of the center bar 103.

As can be seen, a tool that utilizes the compact stress waveguide 100 can be much more compact than a standard Hopkinson bar, while also having far greater adjustability than existing tools. While the momentum traps can be activated symmetrically about the axis or plane of symmetry through the center bar 103, it is also possible to asymmetrically activate the momentum traps in order to provide unique asymmetrical effects to waveform propagation.

Figure 1B:
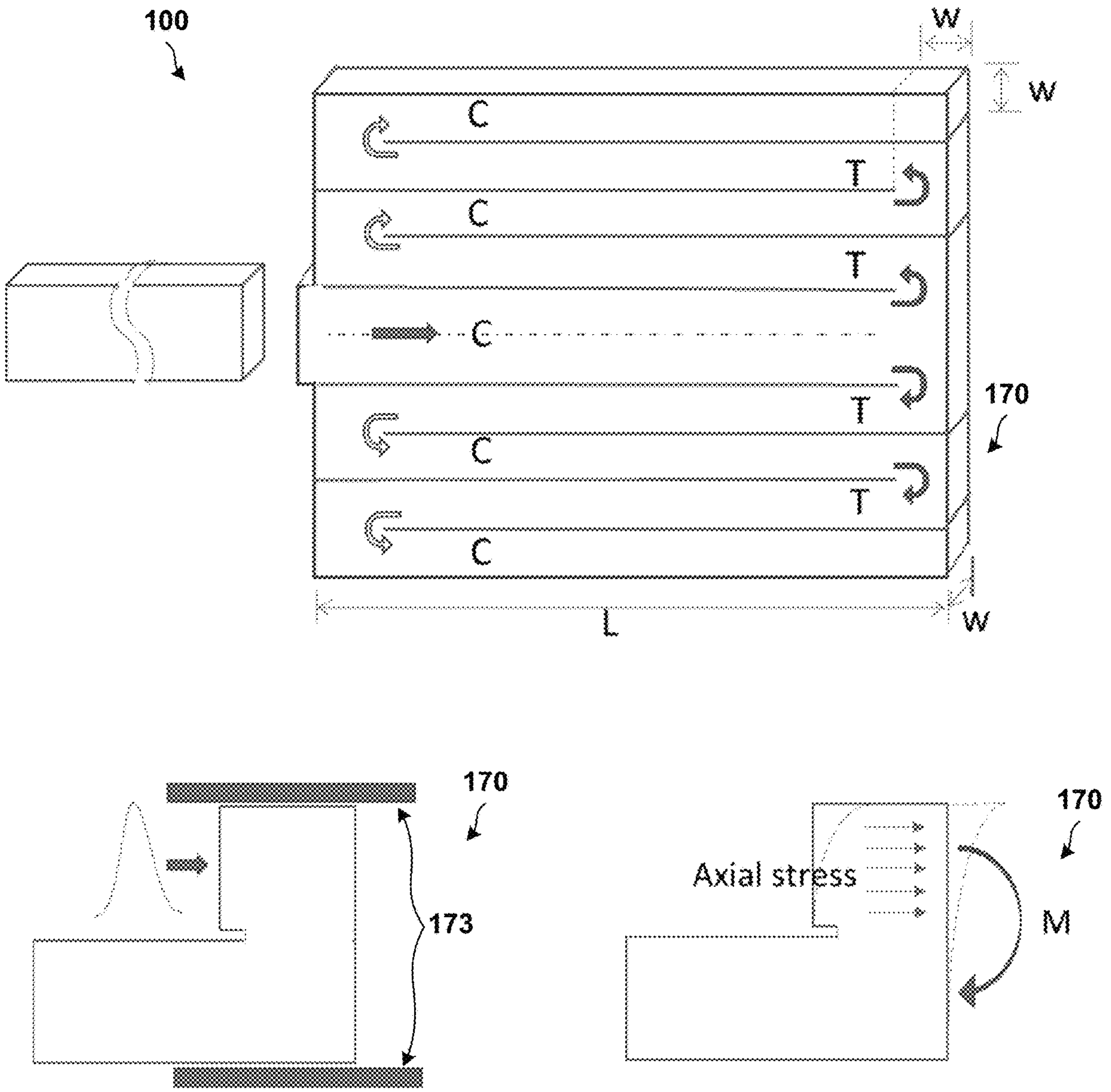
FIG. 1B illustrates an example compact stress waveguide and an example detail illustration of a junction, according to the present disclosure.

FIG. 1B shows a compact stress waveguide 100 and an example detail illustration of a junction 170. The junction 170 can be supported by support plates 173. The junction can also be referred to as a connection point or joint. When the striking component impacts the compact stress waveguide 100, compression wave C can propagate in the compact stress waveguide 100, as well as the tension wave T.

Branching points, joints, or junctions can also include support plates 173. The wave shown can represent force applied by the incoming pulse or compression wave on the junction 170. The bar junction 170 can be constrained in the vertical direction by the support plates 173. This can result in junction deformation as shown in the horizontal direction, since the junction 170 is constrained from vertical motion. The axial force creates a bending moment M at the junction which causes both longitudinal and bending waves.

Figure 1C:
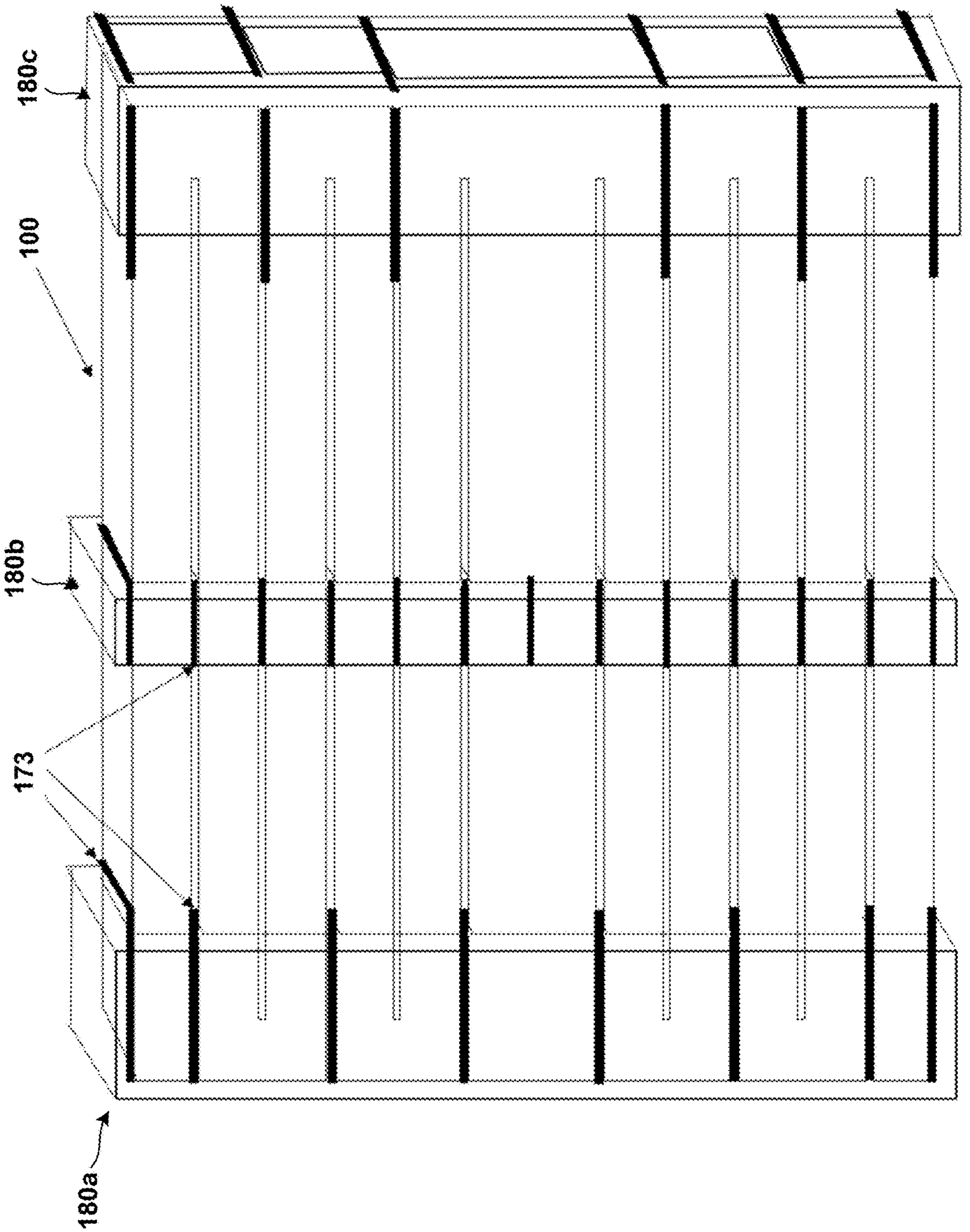
FIG. 1C illustrates an example compact stress waveguide with outer and central support frames, according to the present disclosure.

FIG. 1C shows a compact stress waveguide 100 that includes support frames 180, including an outer support frame 180*a*, a central support frame 180*b*, and an outer support frame 180*c*. The outer support frames 180*a* and 180*c* can support the compact stress waveguide 100 at all the slits between the bars. The supports or support plates 173 can be thin, frictionless, low-friction, or friction-reducing plates. The support plates 173 can also be thin roller bearings. The support plates 173 can have lateral stiffness above a threshold that prevents bending and limits motion to axial motion of the bar. The support frames 180 can prevent rotation of the bars. The outer support frames 180*a* and 180*c* can prevent rotation at the end junctions while the central support frame (or frames) 180*b* can aid this function at the center point or at multiple locations along the bar. The support frames 180 can also be attached together forming an overall frame for the device. In some examples, an overall frame can include a plate, bar, or other connection that connects the support frames 180 to maintain their positions relative to one another.

Figure 1D:
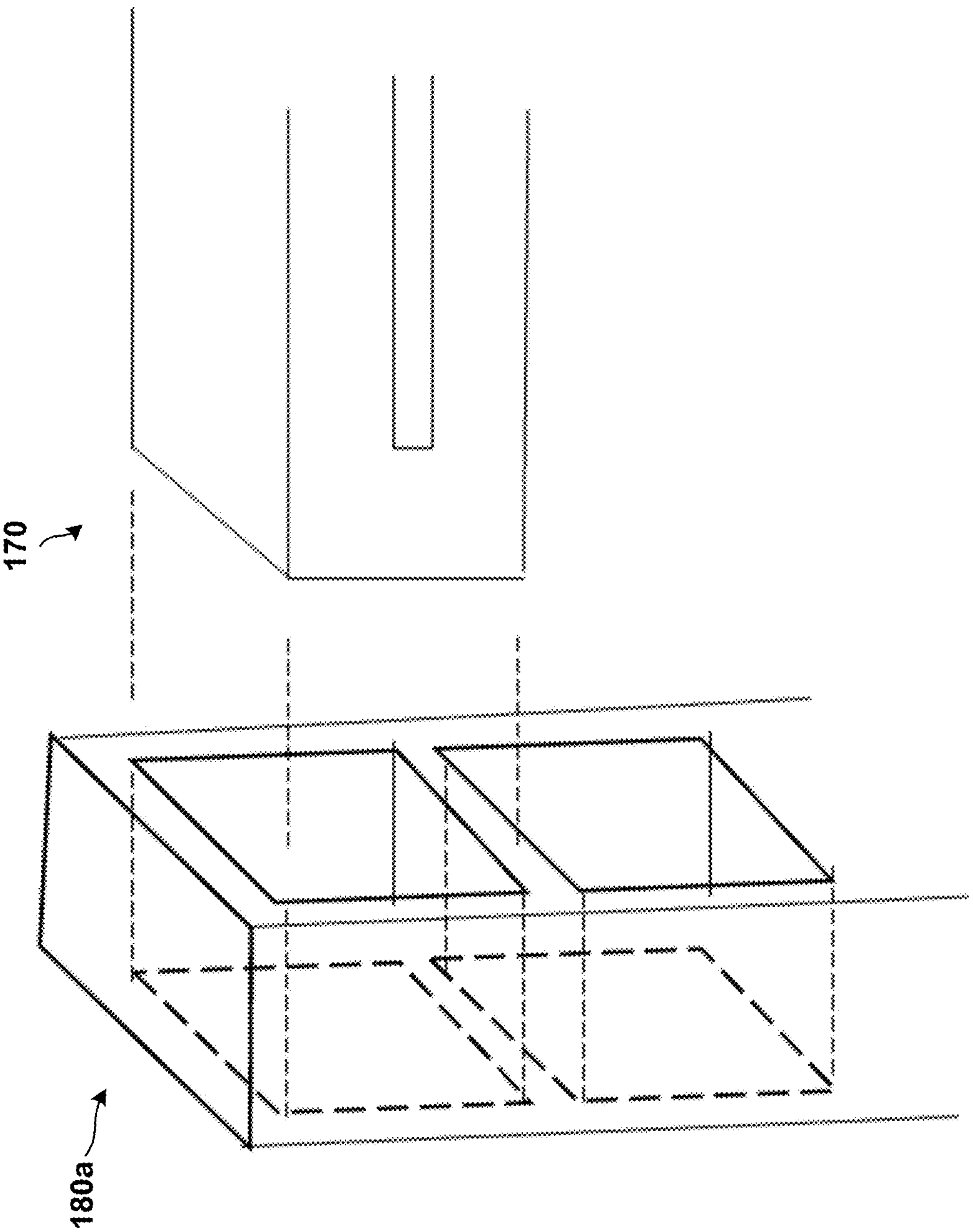
FIG. 1D illustrates an example of a portion of a support frame, according to the present disclosure.

FIG. 1D illustrates an example of a portion of the outer support frame 180*a*. The outer support frame 180*a* can be open on the backside to allows axial motion of the bars, while preventing rotation and preventing vertical motion in conjunction with the support plates 173 (not shown).

Figure 2A:
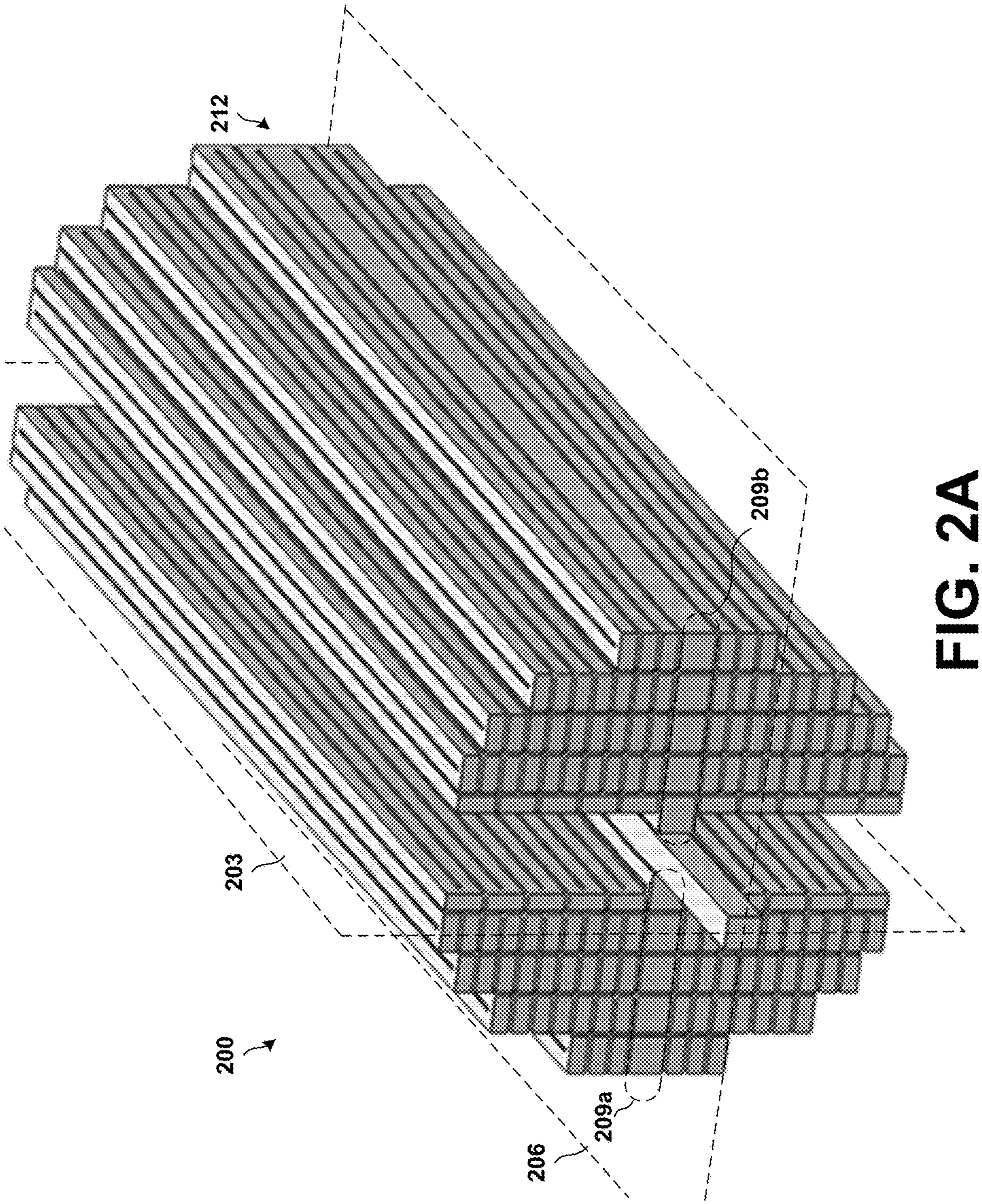
FIG. 2A illustrates another example compact stress waveguide according to the present disclosure.

FIG. 2A shows a compact stress waveguide 200, which can be a three-dimensional branching compact stress waveguide that includes bars or lengths that are symmetrical about two planes of symmetry 203 and 206. The planes of symmetry 203 and 206 can be perpendicular to each other.

The compact stress waveguide 200 can also include a multi-dimensional symmetrical branching and an impedance-matched series of bars that branches a center bar along a first plane of symmetry 203 at a branching point. The sum of the impedances (and cross-sectional areas where a single material is used throughout) of the mirrored branches 209*a* and 209*b* (e.g., left and right branches in the orientation shown) from the center bar can be equivalent to the impedance (and cross-sectional area where a single material is used throughout) of the center bar. The serpentine shape can include a number of lengths that are aligned perpendicular with the center bar on a second plane of symmetry 206 that is perpendicular to the first plane of symmetry 203. In some examples, each of the mirrored branches can include a noncollinear, nonconcentric serpentine shape that is noncollinear and nonconcentric with respect to the center bar.

Each of the mirrored branches 209*a* and 209*b* can itself branch at branching points into two mirrored sub-branches, where the sum of the impedances of the mirrored sub-branches can be equivalent to the impedance of a single one of the mirrored branches from the center bar. For the purpose of illustration, the branching point 212 shows how the branch 209*b* branches vertically into two mirrored serpentine sub-branches. In some examples, each of the mirrored sub-branches can include a noncollinear, nonconcentric serpentine shape that is noncollinear and nonconcentric with respect to the center bar and with respect to the branch 209*b*. The path of the branches and sub-branches is described in greater detail with respect to FIG. 2B. The sub-branches can include a number of lengths that are aligned perpendicular with the center bar and on at least one plane that is parallel to one or more of the first plane of symmetry 203, and the second plane of symmetry 206. The branching design of the compact stress waveguide 200 that is shown includes 79 passes but any number of passes and any number of parallel bars can be used. The architecture shown can achieve, in one scale of this example structure, an equivalent acoustic length of 11.85 meters while having a physical length of 0.15 meters. In other words, the acoustic length is 79 times its physical length.

Figure 2B:
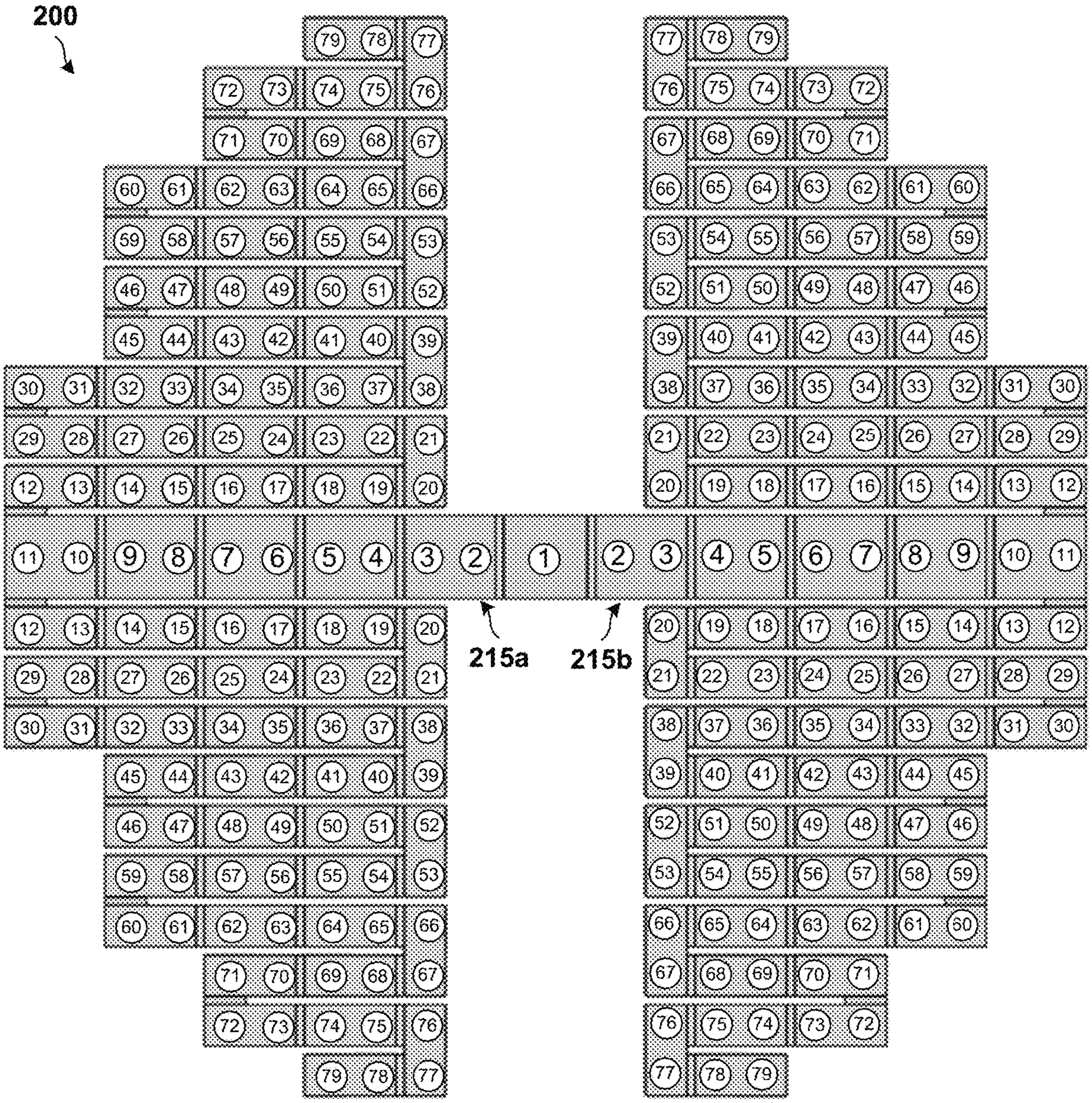
FIG. 2B illustrates a front facing view of the example compact stress waveguide of FIG. 2A, according to the present disclosure.

FIG. 2B shows a front view of the compact stress waveguide 200 of FIG. 2A. This figure provides additional details of the structure of the 79 passes of the compact stress waveguide 200. Each of the passes is identified numerically. For example, the center bar is labelled (1) and can be considered a first "pass" or first equivalent acoustic length of the compact stress waveguide 200.

The center bar (1) can split at a branching point at its distal end into two branch bars (2). Each of the branch bars (2) can be half the impedance of the center bar (1). The two branch bars (2) can together be considered a second pass of equivalent acoustic length of the compact stress waveguide 200. Each of the branch bars (2) can be connected at respective connection points 215*a* and 215*b* to the two branch bars (3). The branch bars (3) can have the same impedance as the branch bars (2). Again, the branch bars labelled (3) can be half the impedance of the center bar (1). The two branch bars labelled (3) can together be considered a third pass of equivalent acoustic length of the compact stress waveguide 200. Each set of the branch bars (or first-order branch bars) labelled (2)-(11) can refer to a set of two bars that can be summed up to the impedance of the center bar (1).

Each of the branch bars (11) can split at a branching point into two sub-branch bars (12). Each of the sub-branch bars (12) can be half the impedance of the branch bars (11), and a quarter of the impedance of the center bar (1). As a result, the four sub-branch bars (12) can together be considered a twelfth pass of equivalent acoustic length of the compact stress waveguide 200. Each set of four sub-branch bars (or second-order branch bars) (12)-(79) can refer to a set of four bars that can be summed up to the impedance of the center bar (1). The sub-branch bars (12)-(79) can be connected using non-branching points in this example. However, where additional branching points are used, the resulting $n^{th}$-order branch bars can be $1/2^n$ the impedance of the center bar (1), and $2^n$ third-order branch bars can be considered a single pass of equivalent acoustic length as that of the center bar (1). As can be seen, each set of bars (2)-(79) is impedance-matched to the center bar (1). As a whole, the sets of bars can be considered an impedance-matched series of secondary bars since each set of bars in the series can be impedance-matched to the primary center bar.

The compact stress waveguide 200 can include all of the features discussed with respect to the compact stress waveguide 100, such as shims, bearings, momentum traps, sensors, and so on. While a particular branching shape and symmetry is shown for the compact stress waveguide 200, any branching shape can be formed with fewer or more branching locations, as can be understood. While the symmetry of the compact stress waveguide 200 is symmetrical about a particular plane, other symmetrical and asymmetrical arrangements can be formed. For example, three (or any number) of symmetrical or asymmetrical branches can branch from a center or primary bar, where a sum of impedances of the three branches is equivalent to that of the primary bar. Non-branching folded bar shapes can also be formed using the concepts described with respect to FIG. 3.

Figure 3:
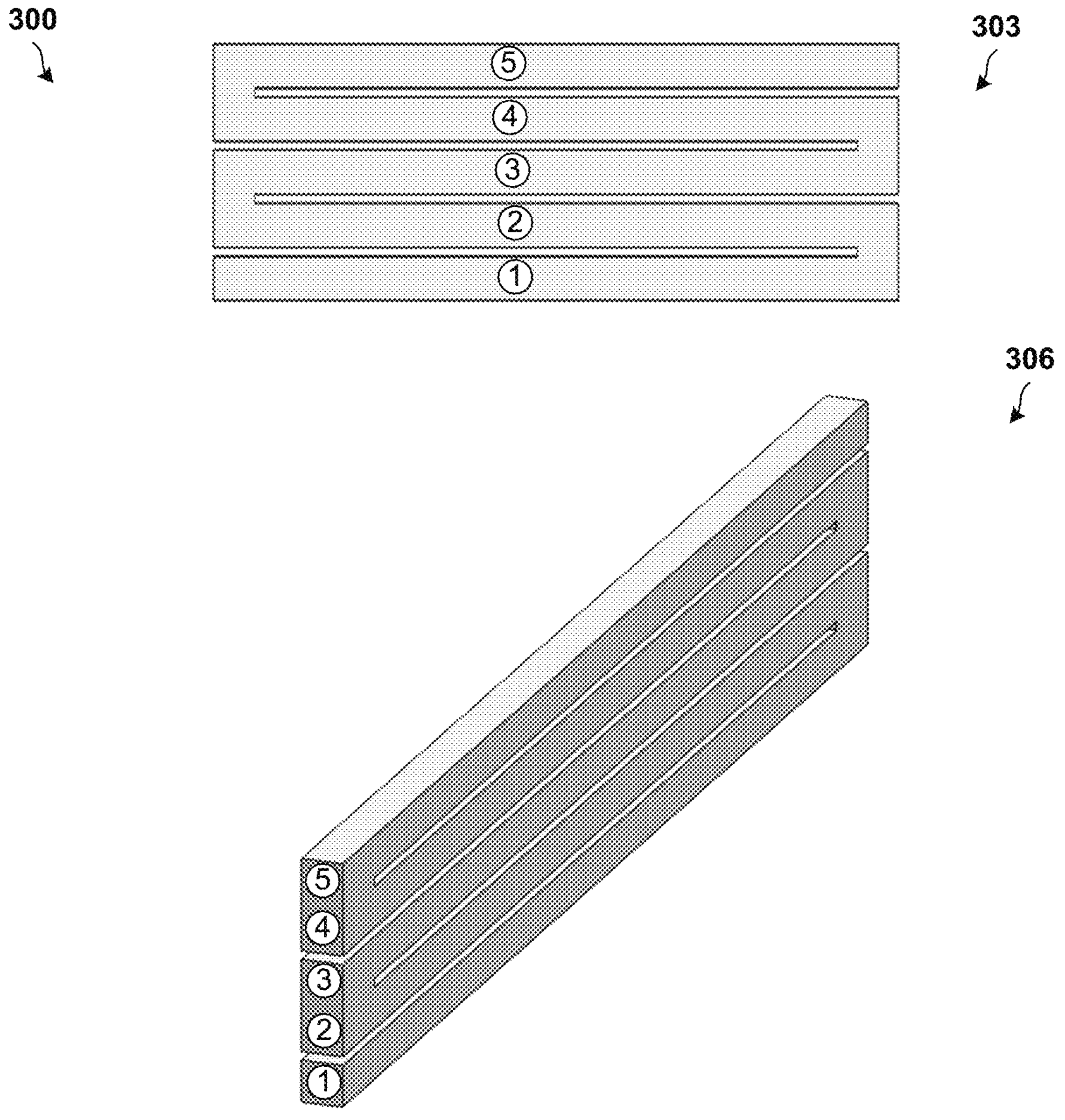
FIG. 3 illustrates views of another example compact stress waveguide according to the present disclosure.

FIG. 3 shows a compact stress waveguide 300. FIG. 3 includes a side view 303 and an isometric view 306 of the compact stress waveguide 300. The compact stress waveguide 300 includes 5 passes in a compact non-branching and asymmetrical folded bar shape. Each of the passes is identified numerically. For example, the primary bar is labelled (1) and can be considered a first "pass" or first equivalent acoustic length of the compact stress waveguide 400. The primary bar (1) can be joined at a first connection point at its distal end that connects to a secondary bar (2) that is impedance-matched with the primary bar (1). The bar (2) can be joined to a bar (3) using a second connection point at an alternate or opposite end from the first connection point. Bar (3) can be impedance-matched to bar (2) as well as the primary bar (1). This pattern can continue for the impedance-matched set of bars labelled (2)-(5). The compact stress waveguide 300 can include all of the features discussed with respect to the compact stress waveguide 100, such as shims, bearings, momentum traps, sensors, and so on. For example, these features can be used to compensate for the moment and/or deflection caused by propagation of a wave through a connection point of the compact stress waveguide 300.

Figure 4:
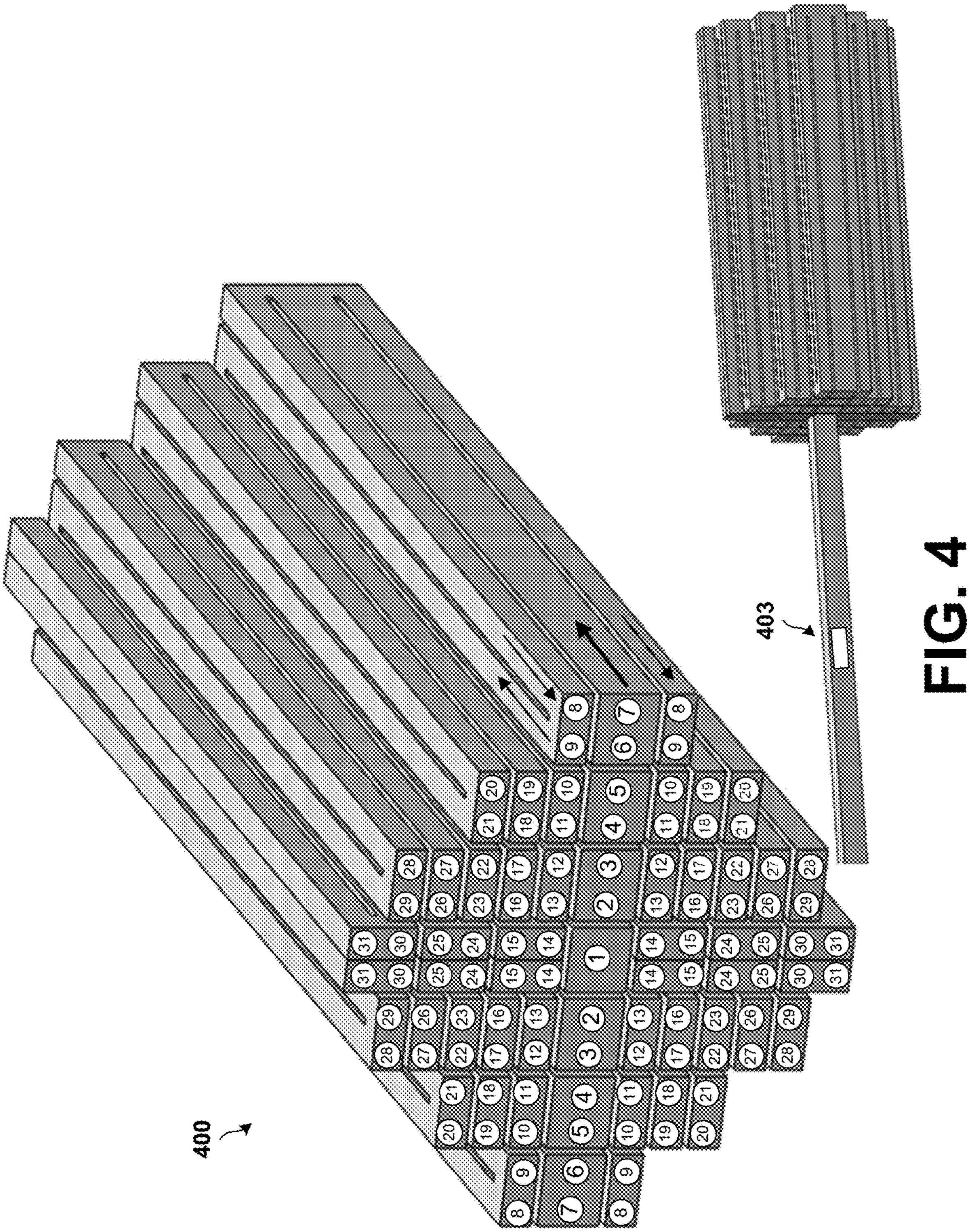
FIG. 4 illustrates isometric views of another example compact stress waveguide according to the present disclosure.

FIG. 4 shows a compact stress waveguide 400. The compact stress waveguide 400 includes 31 passes. Each of the passes is identified numerically. For example, the center bar is labelled (1) and can be considered a first "pass" or first equivalent acoustic length of the compact stress waveguide 400. The compact stress waveguide 400 can include a strain gauge sensor or another type of sensor 403, which can detect waveform propagation and reflection time in order to identify strain measurements and other measurements based on resonance and wave propagation.

The center bar (1) can split at a branching point at its distal end into two branch bars (2). Each set of the branch bars labelled (2)-(7) can refer to a set of two bars that can be summed up to the impedance of the center bar (1). Each of the branch bars (7) can split at a branching point into two sub-branch bars (8). Each of the sub-branch bars (8) can be half the impedance of an individual one of the branch bars (7), and a quarter of the impedance of the center bar (1). Each set of four sub-branch bars (8)-(31) can refer to a set of four bars that can be summed up to the impedance of the center bar (1). The sub-branch bars (8)-(31) can be connected using non-branching points in this example.

Momentum traps can be activated to provide a desired acoustic length. Activating a set of momentum traps located at branch bars (2), such as at the connection point between (2) and (3) can provide an acoustic length of 2L, or two passes. Activating a set of momentum traps located at branch bars (4), such as at the connection point between (4) and (5) can provide an acoustic length of 4L, or four passes. Activating a set of momentum traps located at branch bars (6), such as at the connection point between (6) and (7) can provide an acoustic length of 6L, or six passes. Activating a set of momentum traps located at branch bars (14), such as at the connection point between (14) and (15) can provide an acoustic length of 14L, or 14 passes. Activating a set of momentum traps located at branch bars (24), such as at the connection point between (24) and (25) can provide an acoustic length of 24L, or 24 passes. Activating a set of momentum traps located at branch bars (30), such as at the connection point between (30) and (31) can provide an acoustic length of 30L, or 30 passes. No momentum traps can provide an acoustic length of 31L, or 31 passes. Other locations for momentum traps can be activated, as can be understood. Momentum traps can be located on either end or both ends of the compact stress waveguide 400. In some cases, one or more momentum traps can be adjustable, and can be configured to move to a particular location in order to select and set a desired acoustic length.

Figure 5:
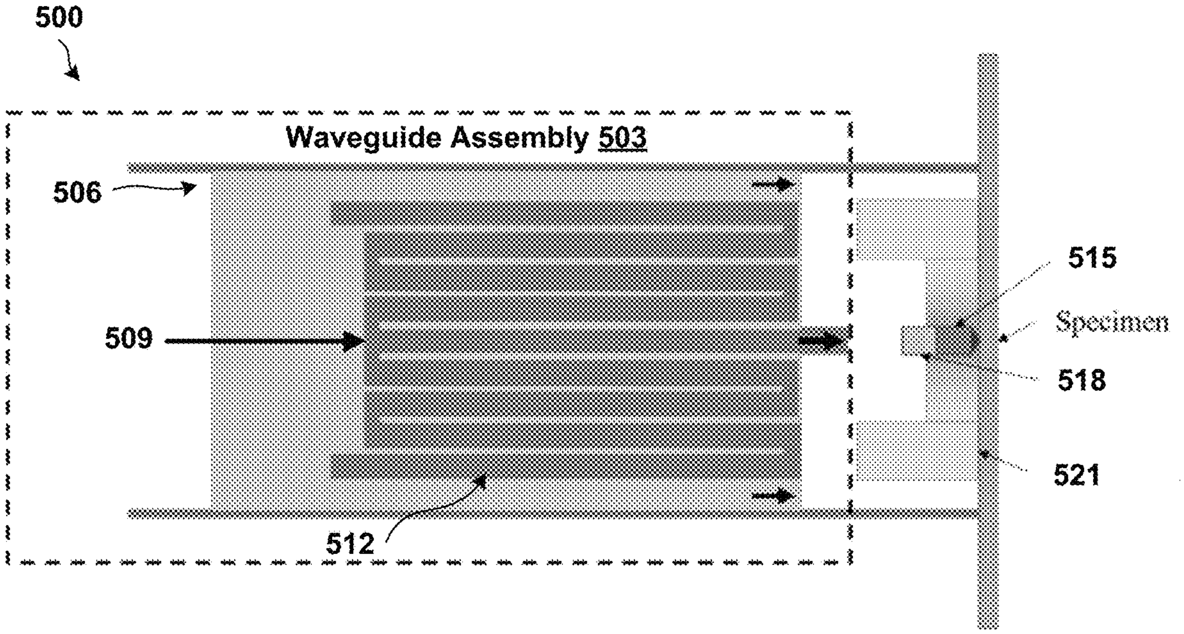
FIG. 5 illustrates a tool that includes a compact stress waveguide according to the present disclosure.
Figure 5:
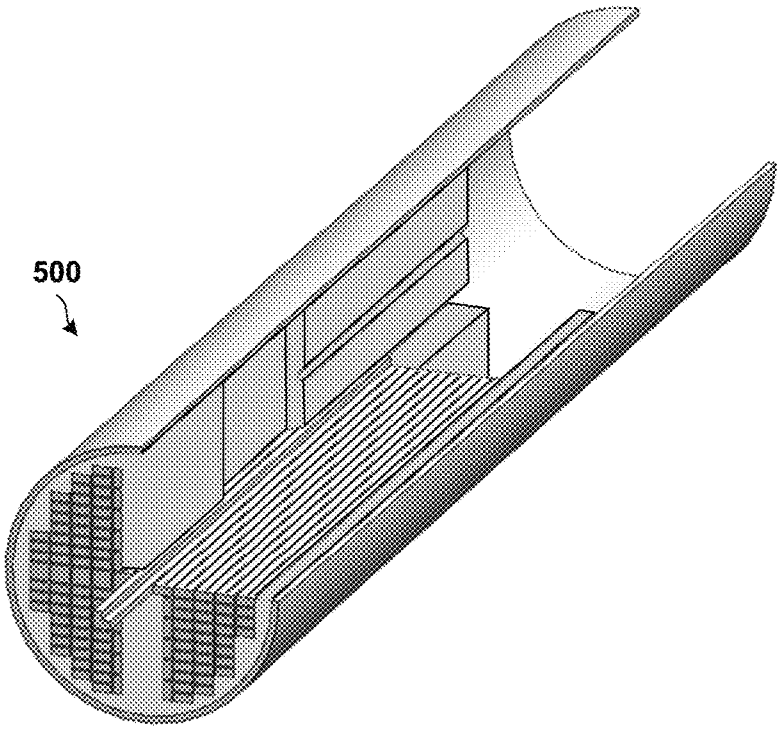

FIG. 5 shows a side view and an isometric view of a tool 500 that utilizes a compact stress waveguide as discussed. The tool 500 can include a handheld or otherwise mobile hardness tester or another tool. The tool 500 can include a waveguide assembly 503 comprising a shell, a slip housing 506, a waveguide actuator 509, and a compact stress waveguide 512. The tool 500 can also include an indenter 515, a load cell 518, and one or more adjustable or configurable momentum traps 521. The tool 500 can be used to test hardness or another property of a material or specimen. Traditional hardness testing includes table top machines and hand-held devices that perform indentation tests at slow speeds within the quasi-static regime. In order to increase the speed at which these machines can operate, they need a load cell that can measure longer waves. Using a compact stress waveguide 512 based on the principles described herein can provide a tool 500 that is greatly reduced in length even to the size of a handheld instrument.

Figure 6:
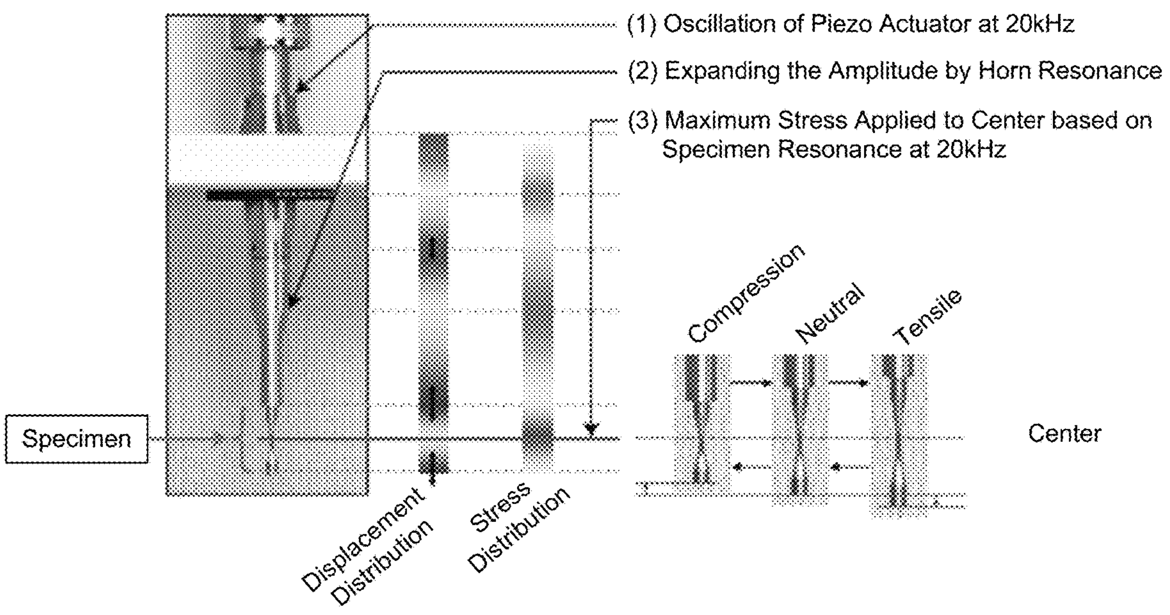
FIG. 6 illustrates another tool that includes another compact stress waveguide according to the present disclosure.
Figure 6:
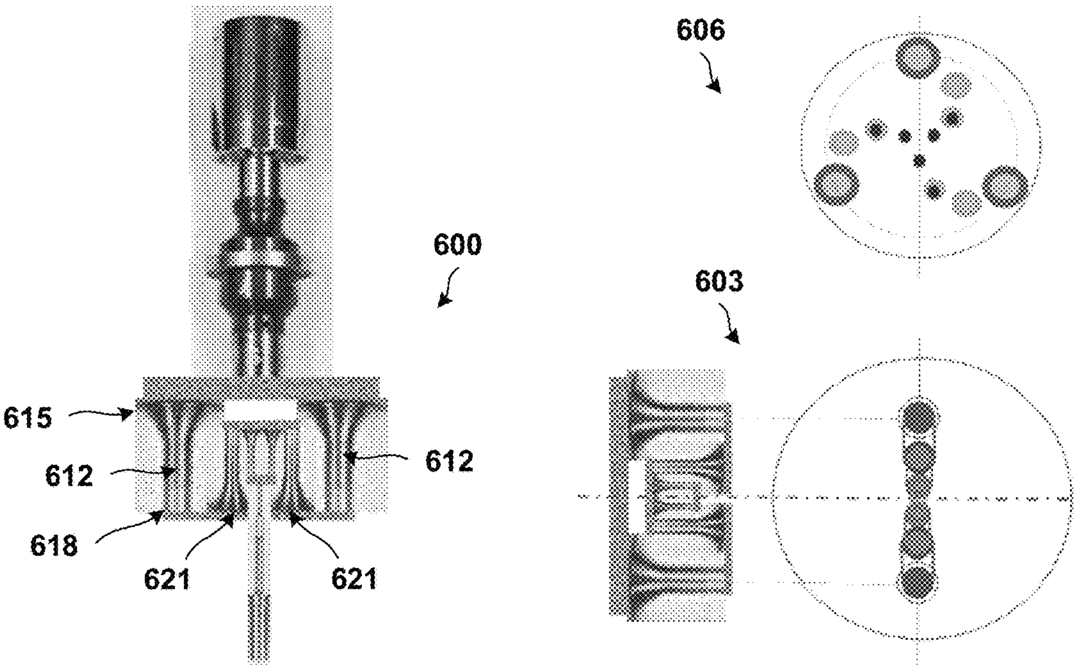

FIG. 6 shows a compact stress waveguide 600. This figure shows that these concepts can be extended to for design of many mechanical testing apparatuses in different areas including uniaxial tension and compression. For example, the compact stress waveguide 600 can be used for ultrasonic fatigue testing.

Ultrasonic fatigue testing can utilize amplification horns which transfer large forces which have small displacements to small forces with large displacements with a gradual reduction in area and/or change of material to vary impedance along the axial length. The frequency at which these ultrasonic fatigue testers can operate can be limited to the length of this horn or bar. The compact stress waveguide 600 includes successive impedance and/or cross-sectional area changes along the axial lengths of bars in a number of levels.

The design of the compact stress waveguide 600 can be in a single plane as shown in the planar 2-fold design 603 with 2 bars per level. However, the concepts described can be extended to a non-planar 2-fold design where each successive level is rotated to reduce the maximum distance between horns. A 3-fold placement design 606, a 4-fold design, or any design can be formed with any number of waveguides or bars per level, depending on the availability of space and the design requirements.

A first level with one or more bars 612 can reduce in cross-sectional area (and thereby vary in impedance) from a first side 615 to a second side 618, between a first platform a second platform. The sum of the impedances (and cross-sectional areas where a same material is used) of the second side 618 of the bars 612 of the first level can be the same as a sum of the impedances (and cross-sectional areas where a same material is used) of a first side of a second level with one or more bars 612. The reduction horns 621 can reduce in cross-sectional area (and thereby vary in impedance) between the second platform and a third platform, and so on.

Figure 7:
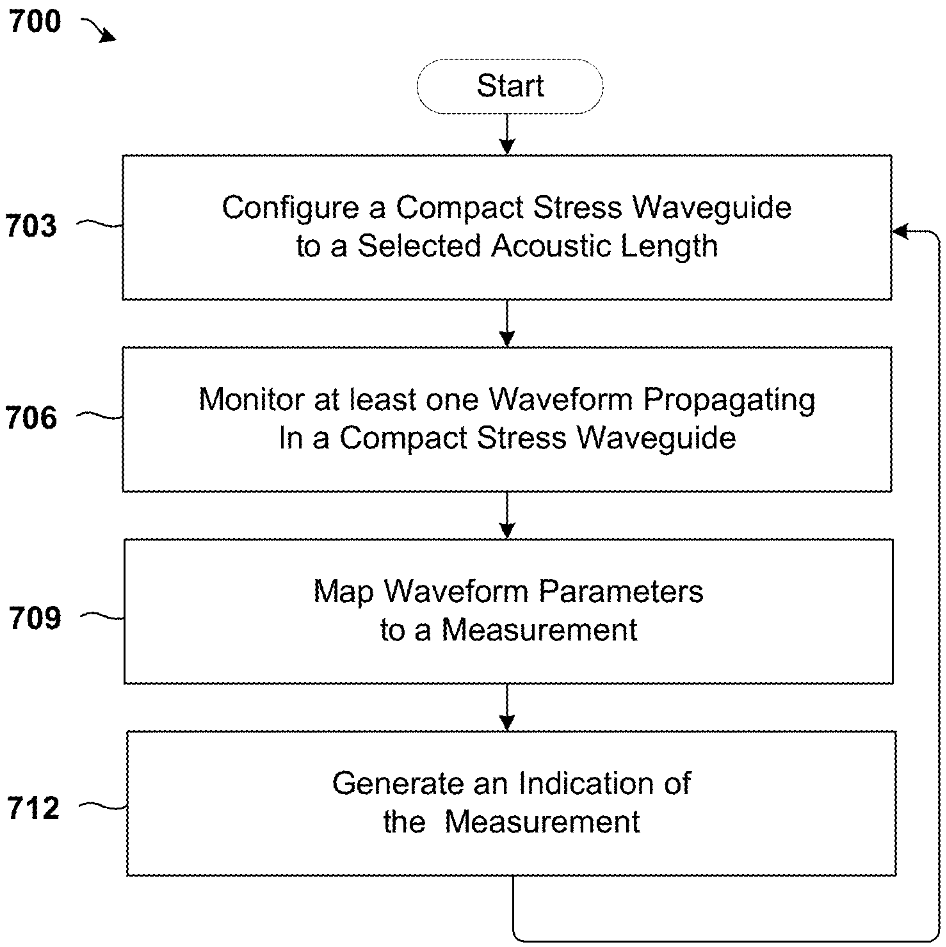
FIG. 7 illustrates a flowchart of the operation of a tool that includes a compact stress waveguide according to the present disclosure.

FIG. 7 shows a flowchart 700 that describes functionalities for providing measurements using a tool that uses a compact stress waveguide such as those described in FIGS. 1-6. While the steps of the flowchart 700 can be referred to as performed by a measurement controller device, certain aspects of the flowchart 700 can be performed using other components. Segmentation and arrangement of the order of the steps are by way of example. The steps can be performed in another order, scrambled relative to one another in any sequence and/or concurrently with any level of timing overlap, as can be understood.

In step 703, the measurement controller device can configure a compact stress waveguide to have a desired acoustic length. For example, a user can specify a desired acoustic length, and the measurement controller device can generate a control signal that controls a set of one or more momentum traps. In other examples, the momentum trap can be physically moved into place by the user by physical manipulation of the tool.

In step 706, the measurement controller device can detect and monitor the effects of a waveform propagating in a compact stress waveguide. For example, a sensor device on the tool can identify the effects of the waveform, and provide waveform parameters to the measurement controller device over time.

In step 709, the measurement controller device can map the waveform parameters to a measurement. For example, an analysis of the timing and magnitude of the waveform over time can be correlated to a particular measurement or measured value. The analysis can include comparing the waveform parameters to a table or another data structure that identifies the measurement. The analysis can also include providing the waveform parameters or values as inputs to an algorithm that identifies the desired measurement.

In step 712, the measurement controller device can provide an indication of the measurement. For example, the measurement controller device can cause a display of the tool to show the measurement. The measurement controller device can cause the tool to generate a sound, or a sound of a particular tone that indicates a particular measurement. The measurement controller device can cause the tool to illuminate a light that is correlated to a particular measurement. The measurement controller device can also include a physical or wireless electronic connection through which the tool can transmit or otherwise provide an indication of the measurement.

Aspects of the present disclosure are related to compact stress waveguides. Compact stress waveguides and measurement tools that use compact stress waveguides are described.

In one aspect, among others, a compact waveguide can include: a primary bar; and an impedance-matched series of secondary bars that is impedance-matched with the primary bar at a connection point that joins at least one secondary bar of the impedance-matched series of secondary bars to the primary bar, wherein a total impedance of the at least one secondary bar is equivalent to an impedance of the primary bar at the connection point, and wherein the at least one secondary bar is noncollinear and nonconcentric with the primary bar.

The connection point can be a branching connection point, and the at least one secondary bar comprises a plurality of branch secondary bars that branch from the primary bar at the branching connection point, and the total impedance is a sum of impedances corresponding to the plurality of branch secondary bars at the branching connection point. The plurality of branch secondary bars can be first-order branch secondary bars, and at least one of the first-order branch secondary bars branches into a plurality of second-order branch secondary bars at a corresponding at least one second-order branching connection point of the impedance-matched series of secondary bars, wherein a sum of impedances of the plurality of second-order branch secondary bars is equivalent to a respective impedance of a respective one of the at least one of the first-order branch secondary bars at the at least one second-order branching connection point.

A particular secondary bar of the impedance-matched series of secondary bars can have a varied or changing impedance at various points along its axial length, and can have equal impedance to a secondary bar or a set of secondary bars that is joined to the particular bar at a particular connection point. A respective secondary bar of the impedance-matched series of secondary bars can be parallel to the primary bar. At least one device can monitor a square waveform that propagates in at least one bar of the primary bar and the impedance-matched series of secondary bars. At least one momentum trap can tune the compact waveguide to have a desired acoustic length. A respective one of the primary bar and the impedance-matched series of secondary bars can have a length greater than its width.

Additional aspects include a method that includes monitoring, by a controller device, at least one waveform propagating in a waveguide. The waveguide includes a primary bar, and a series of secondary bars that is impedance-matched with the primary bar at a connection point that joins at least one secondary bar of the impedance-matched series of secondary bars to the primary bar. The at least one secondary bar is noncollinear and nonconcentric with the primary bar. These aspects can include generating, by the controller device, a measurement based at least in part on at least one parameter of the at least one waveform.

The controller device can map the at least one parameter of the at least one waveform to the measurement. The at least one parameter comprises a timing and a magnitude of the waveform over time, and wherein a data structure is referenced to map the timing and the magnitude to the measurement. The controller device can configure a compact stress waveguide to have a selected acoustic length. The measurement controller device can generate a control signal that controls a set of one or more momentum traps in order to configure the compact stress waveguide to have the selected acoustic length.

Aspects of the disclosure include but are not limited to a waveguide that includes a primary bar, and a series of secondary bars. The series of secondary bars is impedance-matched with the primary bar at a connection point that joins at least one secondary bar of the impedance-matched series of secondary bars to the primary bar. The at least one secondary bar is noncollinear and nonconcentric with the primary bar.

The connection point can include a branching connection point, and the at least one secondary bar comprises a plurality of branch secondary bars. The branch secondary bars can branch from the primary bar at the branching connection point, and the total impedance can be a sum of impedances corresponding to the plurality of branch secondary bars at the branching connection point.

Further aspects include a compact waveguide that includes: a first at least one waveguide attached between a first platform and a second platform, wherein a respective one of the first at least one waveguide varies impedance along a first corresponding axial length; a second at least one waveguide attached between the second platform and a third platform, wherein a respective one of the second at least one waveguide varies impedance along a second corresponding axial length, wherein the first at least one waveguide is impedance-matched to the second at least one waveguide at the second platform; and a primary waveguide that attaches from the third platform to a test sample, wherein the primary waveguide varies impedance along a third axial length, wherein the second at least one waveguide is impedance matched to the primary waveguide at the third platform.

The first at least one waveguide and the second at least one waveguide can be aligned in a single plane. The first at least one waveguide can be arranged in a circular pattern at a predetermined radius around the primary waveguide. A count of the first at least one waveguide can be three or four, or another count.

Other systems, methods, features, and advantages of the present disclosure will be or become apparent to one with skill in the art upon examination of the following drawings and detailed description. It is intended that all such additional systems, methods, features, and advantages included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another. While certain features are described with respect to a particular figure, the features are also applicable to the other figures.

Although the functionalities, services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described aspects and examples of the present disclosure are merely possible examples of implementations set forth for a clear understanding of the principles of the disclosure. The described aspects and examples can be combined with one another. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A compact waveguide, comprising:

a primary bar; and an impedance-matched series of secondary bars that is impedance-matched with the primary bar at a branching connection point that joins a plurality of branch secondary bars of the impedance-matched series of secondary bars to the primary bar, wherein the plurality of branch secondary bars branch from the primary bar at the branching connection point, wherein a total impedance of the plurality of branch secondary bars is equivalent to an impedance of the primary bar at the branching connection point, and wherein the total impedance is a sum of impedances corresponding to the plurality of branch secondary bars at the branching connection point, wherein at least one secondary bar is noncollinear and nonconcentric with the primary bar.

2. The waveguide of claim 1, wherein each of the secondary bars are noncollinear and nonconcentric with the primary bar.

3. A method, comprising:

monitoring, by a controller device, at least one waveform propagating in a waveguide comprising: a primary bar, and an impedance-matched series of secondary bars that is impedance-matched with the primary bar at a connection point that joins at least one secondary bar of the impedance-matched series of secondary bars to the primary bar, wherein the at least one secondary bar is noncollinear and nonconcentric with the primary bar; and generating, by the controller device, a measurement based at least in part on at least one parameter of the at least one waveform;

wherein the connection point is a branching connection point;

wherein each secondary bar comprises a plurality of branch secondary bars; and wherein a total impedance of the plurality of branch secondary bars is a sum of impedances corresponding to the plurality of branch secondary bars at the branching connection point.

4. The method of claim 3, further comprising:

mapping, by the controller device, the at least one parameter of the at least one waveform to the measurement.

5. The method of claim 4, wherein the at least one parameter comprises a timing and a magnitude of the at least one waveform over time, and wherein a data structure is referenced to map the timing and the magnitude to the measurement.

6. The method of claim 3, further comprising:

configuring, by the controller device, a compact stress waveguide to have a selected acoustic length.

7. The method of claim 6, wherein the controller device generates a control signal that controls a set of one or more momentum traps in order to configure the compact stress waveguide to have the selected acoustic length.

8. The method of claim 3, wherein the plurality of branch secondary bars are first-order branch secondary bars, and each of the first-order branch secondary bars branches into a plurality of second-order branch secondary bars at a corresponding second-order branching connection point of the impedance-matched series of secondary bars.

9. The method of claim 8, wherein a sum of impedances of the plurality of second-order branch secondary bars is equivalent to a respective impedance of a respective first-order branch secondary bars at the second-order branching connection point.

* * * * *